US011171883B1

(12) United States Patent
Ma (10) Patent No.: US 11,171,883 B1
(45) Date of Patent: Nov. 9, 2021

(54) PEERING-FABRIC ROUTING USING SWITCHES HAVING DYNAMICALLY CONFIGURABLE FORWARDING LOGIC (71) Applicant: MELLANOX TECHNOLOGIES, LTD., Yokneam (IL)

(72) Inventor: Shaowen Ma, Singapore (SG)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 0 days.

(21) Appl. No.: 16/921,987

(22) Filed: Jul. 7, 2020

(51) Int. Cl.
| *H04L 12/721* | (2013.01) |
| *H04L 12/751* | (2013.01) |
| *H04L 12/935* | (2013.01) |
| *H04L 12/931* | (2013.01) |
| *H04L 12/741* | (2013.01) |
| *H04L 12/703* | (2013.01) |

(52) U.S. Cl.
CPC .......... *H04L 49/3009* (2013.01); *H04L 45/02* (2013.01); *H04L 45/28* (2013.01); *H04L 45/38* (2013.01); *H04L 45/54* (2013.01); *H04L 45/745* (2013.01); *H04L 49/602* (2013.01)

(58) Field of Classification Search
CPC ..... H04L 49/3009; H04L 45/02; H04L 45/38; H04L 45/28; H04L 45/54; H04L 49/602; H04L 45/745
See application file for complete search history.

(56) References Cited

U.S. PATENT DOCUMENTS

| 6,981,055 | B1 | 12/2005 | Ahuja et al. |
| 7,385,988 | B2 | 6/2008 | Asati |
| 7,742,477 | B1 | 6/2010 | Guichard et al. |
| 8,824,274 | B1 * | 9/2014 | Medved ................ H04L 47/20 370/217 |

(Continued)

FOREIGN PATENT DOCUMENTS

EP  2355423 A1  8/2011

OTHER PUBLICATIONS

Anderson, "Slimming down the Internet routing table", Redpill Linpro, pp. 1-11, year 2015-2016, downloaded from https://www.redpill-linpro.com/sysadvent/2016/12/09/slimming-routing-table.html.

(Continued)

*Primary Examiner* — Mohamed A Kamara
(74) *Attorney, Agent, or Firm* — Kligler & Associates Patent Attorneys Ltd (57) ABSTRACT

A routing apparatus includes interconnected switches and a server. At least some of the switches connect to routers belonging to multiple subnetworks, and at least a given switch is configured to receive a packet destined to a subnetwork reachable via the given switch, and forward the packet using forwarding logic of the given switch that supports only a partial subset of the subnetworks, and to monitor traffic flow via the given switch and report traffic flow information indicative of a given subnetwork that is unreachable via the given switch. The server is coupled to (Continued)

the switches, and is configured to receive the traffic flow information from the given switch, and determine switch forwarding information for the given subnetwork, based on the traffic flow information, and to download the switch forwarding information to the given switch, for enabling the forwarding logic to forward subsequent packets destined to the given subnetwork.

18 Claims, 4 Drawing Sheets

(56) References Cited

U.S. PATENT DOCUMENTS

| | | | |
|---|---|---|---|
| 8,831,014 B2 | 9/2014 | Koodli et al. | |
| 9,049,251 B2 | 6/2015 | Ravindran et al. | |
| 9,473,408 B1 * | 10/2016 | Kabbani | H04L 47/122 |
| 9,960,994 B2 | 5/2018 | Bonica et al. | |
| 2005/0047413 A1 | 3/2005 | Ilnicki et al. | |
| 2008/0212586 A1 | 9/2008 | Wang et al. | |
| 2011/0116509 A1 * | 5/2011 | Moreno | H04L 45/28 |
| | | | 370/401 |
| 2015/0229560 A1 * | 8/2015 | Qiu | H04L 43/0811 |
| | | | 370/218 |

OTHER PUBLICATIONS

Rekhter et al., "A Border Gateway Protocol 4 (BGP-4)", Request for Comments (RFC) 4271, pp. 1-104, Jan. 2006.

* cited by examiner

PEERING-FABRIC ROUTING USING SWITCHES HAVING DYNAMICALLY CONFIGURABLE FORWARDING LOGIC

TECHNICAL FIELD

Embodiments described herein relate generally to data communication, and particularly to methods and systems for peering-fabric based routing, using switches having dynamically configurable forwarding logic.

BACKGROUND

Large packet networks are often built from multiple subnetworks that communicate with one another using routers. A router in one subnetwork forwards a packet to a next-hop router in another subnetwork towards the packet's destination.

Methods for routing among multiple subnetworks are known in the art. For example, European Patent Application EP2355423, describes revisiting the architecture of IP routers based on the observations i) that the quality of open source routing software is getting to a point where it is usable in carrier grade networks and ii) that the major difference between switches and routers is in the software. Accordingly, the present invention proposes an alternative low-cost high-performance router concept that a) uses commodity PC hardware with an open source software router for the control path and b) couples it with lower cost switching hardware by delegating packet forwarding to the switch.

The present invention describes an implementation scenario and shows that the system according to the present invention is capable of handling full IP routing tables and the traffic requirements of a carrier aggregation network.

SUMMARY

An embodiment that is described herein includes a routing apparatus that includes multiple interconnected switches and a server. At least some of the switches connect directly or indirectly to routers belonging to multiple subnetworks, and at least a given switch among the multiple switches is configured to receive a packet destined to a subnetwork reachable via the given switch, from a switch or a router, and forward the packet using forwarding logic of the given switch, the forwarding logic supports only a partial subset of the multiple subnetworks, and to monitor traffic flow via the given switch and report traffic flow information indicative of at least a given subnetwork that is unreachable via the given switch. The server is coupled to one or more of the switches, and includes a processor configured to receive the traffic flow information from the given switch, and determine switch forwarding information for at least the given subnetwork, based at least on the traffic flow information, and to download the switch forwarding information to the given switch, for enabling the forwarding logic of the given switch to forward subsequent packets destined to the given subnetwork.

In some embodiments, the server includes a forwarding database supporting access to one or more subnetworks that are unreachable using the forwarding logic of the given switch, and the processor is configured to receive from the given switch a packet destined to a subnetwork that is unreachable using the forwarding logic currently used by the given switch, and to forward the packet using the forwarding database. In other embodiments, the processor is configured to determine the switch forwarding information by selecting a partial subset of subnetworks reachable by the forwarding database. In yet other embodiments, the processor is configured to determine the switch forwarding information by performing one or more of (i) selecting from the forwarding database one or more address prefixes to be evicted from the forwarding logic and (ii) selecting from the forwarding database one or more address prefixes to be added to the forwarding logic.

In an embodiment, the multiple subnetworks include autonomous systems of the Internet, the forwarding logic includes a Forwarding Information Table (FIB), the forwarding database includes a Routing Information Base (RIB), and the FIB and RIB support routing based on address prefixes associated with respective autonomous systems. In another embodiment, the traffic flow information is indicative of a prevalence of subnetworks destined to by the given switch, and the processor is configured to determine the switch forwarding information by selecting for the given switch, based on the prevalence, up to a predefined number of the multiple subnetworks. In yet another embodiment, before receiving a first switch forwarding information, the given switch is configured to forward received packets to a selected default subnetwork.

In some embodiments, the given switch is configured to monitor the traffic flow using one or more protocols selected from a protocol list including a NetFlow protocol, a BGP Monitoring Protocol (BMP), and a Sampled Flow (sFlow) protocol. In other embodiments, the given switch is configured to determine, using the forwarding logic a next-hop route for a packet, based on address prefixes in a FIB.

There is additionally provided, in accordance with an embodiment that is described herein, a method for routing, including, in a routing apparatus that includes multiple interconnected switches, and a server coupled to one or more of the switches, at least some of which connect directly or indirectly to routers belonging to multiple subnetworks, receiving a packet destined to a subnetwork reachable via the given switch, from a switch or a router, and forwarding the packet using forwarding logic of the given switch, the forwarding logic supports only a partial subset of the multiple subnetworks.

Traffic flow via the given switch is monitored and traffic flow information indicative of at least a given subnetwork that is unreachable via the given switch is reported. The traffic flow information from the given switch for at least the given subnetwork is received by the server, and switch forwarding information is determined for at least the given subnetwork, based at least on the traffic flow information. The switch forwarding information is downloaded to the given switch for enabling the forwarding logic of the given switch to forward subsequent packets destined to the given subnetwork.

These and other embodiments will be more fully understood from the following detailed description of the embodiments thereof, taken together with the drawings in which:

DETAILED DESCRIPTION OF EMBODIMENTS

Overview

Routing in IP networks is typically based on address prefixes. For example, a communication network such as a Wide Area Network (WAN) or the Internet is typically built from a large number of subnetworks, each of which is identified by an address prefix. The subnetworks comprising the Internet are also referred to as Autonomous Systems (ASs) or Internet Service Providers (ISPs). A router that routes traffic among subnetworks is also referred to herein as a "peering router."

Embodiments that are described herein provide systems and methods for routing using a peering fabric comprising interconnected switches having dynamically configurable forwarding logic.

A router in a communication network may comprise a large number of routing entries for reaching all the underlying subnetworks. For example, a router for autonomous systems in the Internet may comprise on the order of 780,000 entries or more, to cover the entire Internet. Supporting so many routes, typically requires a complex and expensive router.

In principle, a low-cost hardware-implemented switch could be used instead of the expensive router. A hardware switch implemented, e.g., in an ASIC, however, typically comprises a relatively small on-chip memory for routing, e.g., using the Longest Prefix Match (LPM) routing method. A hardware switch therefore supports only up to about 100,000 routes. One approach to increase the routing capabilities could be to use an off-chip memory or an ASIC-based router. In this approach, however, routing speed would reduce to about ⅓ or ¼ of the routing speed achievable by a same generation ASIC-based switch. For example, an ASIC-based switch may support traffic at 3.2 or even 6.4 Terabytes per second, whereas a same generation ASIC-based router may support only on the order of 600 to 900 Gigabytes per second.

A router for the global internet may support routes that are rarely used. As a rough empirical estimation, less than 50,000 router entries may correspond to about 99% of the entire traffic flowing through the router.

This observation leads to an approach in which a low-cost hardware switch (or multiple switches) may be used for routing most of the traffic incoming to the switch, whereas subnetworks that are unreachable using this switch will be sent to a server that performs routing in software, using a full routing table.

In some embodiments, a routing apparatus in a communication network comprises multiple interconnected switches and a server coupled to one or more of the switches. At least some of the switches connect directly or indirectly to routers belonging to multiple subnetworks of the communication network. In some embodiments, at least a given switch among the multiple switches is configured to receive a packet destined to a subnetwork reachable via the given switch, from a switch or a router, and forward the packet using forwarding logic of the given switch, wherein the forwarding logic supports only a partial subset of the multiple subnetworks. The given switch monitors traffic flow via the given switch and reports traffic flow information indicative of at least a given subnetwork that is unreachable via the given switch. The server receives the traffic flow information from the given switch, and determines the switch forwarding information for at least the given subnetwork, based at least on the traffic flow information. The server further downloads the switch forwarding information to the given switch, for enabling the forwarding logic of the given switch to forward subsequent packets destined to the given subnetwork.

In some embodiments, the forwarding logic may perform packet routing, for example, by determining for the packet a next-hop route based on address prefixes in a forwarding table, and/or using packet processing rules in one or more Access Control Lists (ACLs).

In some embodiments, the server comprises a forwarding database supporting access to one or more subnetworks that are unreachable using the forwarding logic. In response to receiving from the given switch a packet destined to a subnetwork that is unreachable using the forwarding logic, the given switch sends the packet to the server that forwards the packet using the forwarding database. The server determines the forwarding information for the given switch, e.g., by selecting a partial subset of subnetworks reachable by the forwarding database of the server.

In an Internet application, the multiple subnetworks comprise autonomous systems of the Internet, the forwarding logic comprises a Forwarding Information Table (FIB), the forwarding database comprises a Routing Information Base (RIB), and the FIB and RIB support routing based on address prefixes associated with respective autonomous systems. In an embodiment, the traffic flow information is indicative of a prevalence of subnetworks destined to by the given switch, and the server determines the switch forwarding information by selecting for the given switch, based on the prevalence, up to a predefined number of the subnetworks.

The given switch may monitor traffic flow in various ways. For example, the given switch may monitor the traffic flow using one or more of the following protocols: NetFlow, BGP Monitoring Protocol (BMP), Sampled Flow (sFlow).

The disclosed routing apparats is suitable for replacing expensive peering routers supporting routing across the entire communication network. The routing apparatus may provide affordable solution in various applications, such as, for example, implementing a peer router for an Internet Exchange Point (IXP), connecting between a Content Delivery Network (CDN) and an ISP, and as a Data Center (CD) gateway router.

In the disclosed techniques, a routing apparatus comprises a peering fabric comprising multiple low-cost switches interconnected, e.g., in a Clos topology. The switches have dynamically configurable forwarding logic that is adaptable to support, at any given time, routing to a relatively small number of subnetworks that are found to be more important than others. Packets for which routing could not be resolved by the peering fabric are sent to be routed by an external server. The routing apparatus performs efficient low-latency routing, and supports line rates above 3.2T per switch and up to and above 100T via the Clos topology of multiple switches.

System Description

Figure 1:
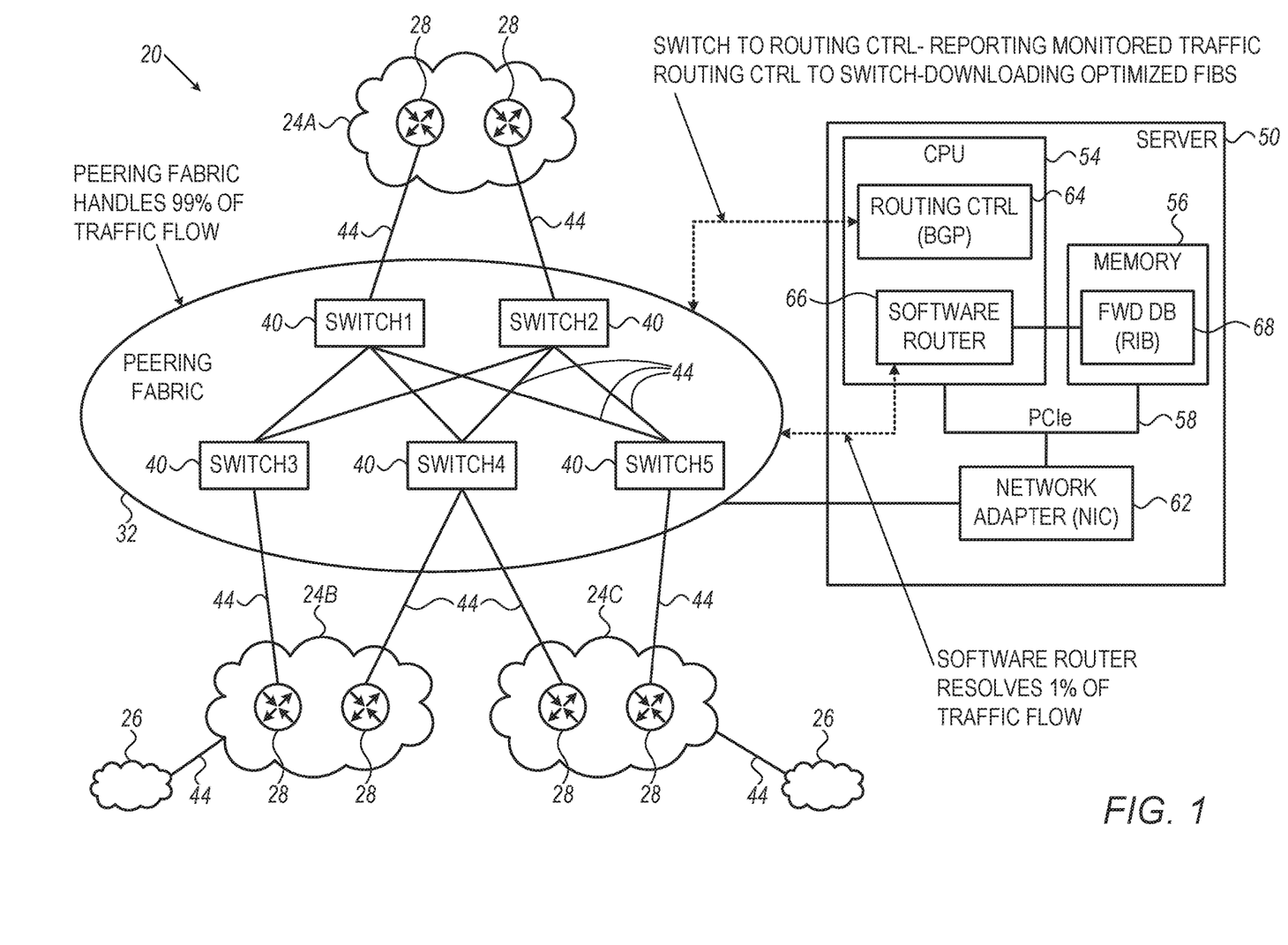
FIG. 1 is a block diagram that schematically illustrates a communication network in which a configurable peering fabric routes packet traffic among multiple subnetworks, in accordance with an embodiment that is described herein.

FIG. 1 is a block diagram that schematically illustrates a communication network 20 in which a configurable peering fabric routes packet traffic among multiple subnetworks, in accordance with an embodiment that is described herein.

Communication network 20 may comprise a packet network such as an IP network or an Ethernet network operating in accordance with any suitable standards or protocols. In alternative embodiments, the disclosed techniques can be implemented in other kinds of network elements such as routers, bridges or network processors. The network element and communication network may operate in accordance with any other suitable communication standard or protocol, such as an InfiniBand (IB) fabric comprising multiple subnetworks.

Communication network 20 comprises multiple subnetworks 24, each of which comprising multiple routers 28. Communication network 20 further comprises multiple remote subnetworks 26 coupled to at least some of subnetworks 24. A router 28 belonging to a subnetwork 24 exchanges packet traffic with a router of another subnetwork 24 using a peering fabric 32. In the embodiment of FIG. 1, a subnetwork 24 is accessible directly via peering fabric 32, whereas a subnetwork 26 is accessible indirectly via the peering fabric.

In the present context and in the claims, the term "connect directly to" refers to a direct connection between two network elements, and the term "connect indirectly" refers to an indirect connection between two network elements via one or more other network elements. Each of the network elements may comprise, for example, a switch or a router.

In some embodiments, as will be described in detail below, subnetworks 24 may be configured as peering subnetworks, e.g., using a suitable protocol such as, for example, the Border Gateway Protocol (BGP). The BGP is described, for example, in "A Border Gateway Protocol 4 (BGP-4)" Request for Comments (RFC) 4271, January 2006.

Communication network 20 may be managed, in an embodiment, using Software-Defined Networking (SDN) technology. SDN enables dynamic and efficient network configuration for improving network performance and increasing network flexibility. In SDN, packet forwarding (data plane) and routing process (control plane) are handled separately. Using SDN enables to identify which FIB entries are actually being used by a given switch, and download to the switch these entries with high priority.

Communication network 20 may be used in various applications. For example, communication network 20 may comprise the Internet, in which case each of subnetwork 24A, 24B and 24C may comprise an Internet Service Provider (ISP) network, also referred to as an Autonomous System (AS). As another example, peering fabric 32 may serve as an Internet Exchange Point (IXP) interconnecting multiple ISPs, Content Delivery Network (CDN), or both.

In yet another embodiment, communication network 20 may comprise a Wide Area Network (WAN) built from multiple subnetworks 24 and 26.

In the context of the present patent application and in the claims, the term "packet" is used to describe the basic data unit that is routed through communication network 20. Different network types and communication protocols use different terms for such data units, e.g., packets, frames or cells. All of these data units are regarded herein as packets.

In some embodiments of communication network 20, IP packets are routed based on IP addresses, comprising an address prefix and a host identifier. The address prefix identifies a whole subnet 24 and comprises a group of most significant bits. The host identifier specifies a destination interface of a host on that subnetwork and comprises a group of least significant bits. The term "address prefix" is also simply referred to as a "prefix" for brevity.

Peering fabric 32 comprises multiple interconnected switches 40. In the example of FIG. 1, peering fabric 32 comprises five switches denoted SWITCH1 ... SWITCH5. In practical applications, however, peering fabric 32 may comprise hundreds or even thousands of switches. For example, in a public transportation metro network, peering fabric 32 may comprise 100 switches or more.

Switches 40 may be interconnected using any suitable interconnection scheme or topology. In the present example, switches 40 are interconnected in a two-level Clos topology, wherein SWITCH1 and SWITCH2 serve as "spine switches," and SWITCH3, SWITCH4 and SWITCH5 serve as "leaf switches." In alternative embodiments, a CLOS topology comprising three or more levels can also be used.

Each of switches 40 may connect to one or more other switches in the peering fabric, and possibly to one or more routers 28. Switches 40 and routers 28 are connected to one another using any suitable links 44, such as, for example, electrical cables or optical fibers.

In some embodiments, each switch 40 supports routing to a subset of a group of subnetworks comprising both directly reachable subnetworks 24 and indirectly reachable subnetworks 26. As will be described below, a packet that cannot be routed via peering fabric 32, because routing information for that packet is excluded from switches 40, will be sent to be routed by software.

Communication network 20 further comprises a server 50 that (i) manages the subnetwork routing via peering fabric 32 and (ii) performs software routing. Server 50 comprises a processor 54, in the form of a central processing unit (CPU), and a memory 56, which are interconnected by any suitable bus 58. In the present example, bus 58 comprises a Peripheral Component Interconnect Express (PCIe) bus. Server 50 further comprises a network adapter 62 such as a Network Interface Controller (NIC), for connecting to communication network 20 and specifically to one or more switches 40 in peering fabric 32.

In some embodiments, processor 54 runs a routing controller 64 and a software router 66. Routing controller 64 is configured to exchange routing and reachability information among subnetworks 24. In embodiments in which subnetworks 24 comprise autonomous systems (e.g., ISPs), routing controller 64 may comprise the BGP, which enables best path routing by hoping via autonomous systems comprising the Internet.

Software router 66 receives for routing, via network adapter 62, packets that failed routing by the switches of peering fabric 32. In some embodiments, software router 66 performs packet routing, in software, using a forwarding database 68, which stores routing information for forwarding packets to subnetworks 26 that are unreachable via peering fabric 32. In some embodiment, data base 68 stores full routing information for the entire Internet. After the packet is looked-up and forwarded by software router 66, the routing controller downloads the missing prefix to the switch, thus closing the loop.

In some embodiments, forwarding database 68 handles routing up to a number of subnetworks that is much larger than can be handled by switch 40. For example, in an Internet application, forwarding database 68 may comprise a Routing Information Base (RIB) supporting routing up to a number of different address prefixes on the order of 780K, whereas switch 40 can route up to about 100K address prefixes.

As will be described in detail below, routing controller 64 uses forwarding database 68 for forwarding packets received in peering fabric 32 that are destined to a subnetwork that is unreachable using the switch forwarding logic.

In some embodiments, each of (or part of) switches 40 monitors traffic flowing through the switch, and reports to routing controller 64 corresponding traffic information. The traffic flowing through the switch comprises multiple data flows, and the traffic pattern may change over time. In the present context, a data flow comprises a sequence of packets sent from a source to a destination over communication network 20. A data flow may be identified by one or more fields in the packet header such as, for example, one of more of source address, destination address, source port number, destination port number and the underlying network protocol used.

The traffic information generated by switch 40 may be indicative, for example, of the prevalence of destination address prefixes within the traffic received in that switch within a certain time window, destination address prefixes that failed routing via the peering fabric, and the like.

In some embodiments, routing controller 64 determines, based on traffic information received from a given switch 40, routing information to be downloaded to the given switches. Alternatively, the routing controller may determine routing information for a given switch based on traffic information received from multiple switches.

Typically, different routing information will be downloaded to different respective switches. Note that the routing information may be stored in different formats and/or encoding in forwarding database 68 of software router 66, and in switches 40.

In some embodiments, routing controller 64 determines the routing information for a switch 40 so that the switch can perform routing to a subset of the entire address prefixes supported by forwarding database 68. Routing controller 64 may select a subset of address prefixes for achieving optimal performance using any suitable optimality criterion. For example, the optimality criterion may specify selecting the subset of address prefixes so as to reduce the likelihood of failing to route a packet by the switch. Routing controller 64 downloads the optimized routing information to the relevant switches.

Switch Block Diagram

Figure 2:
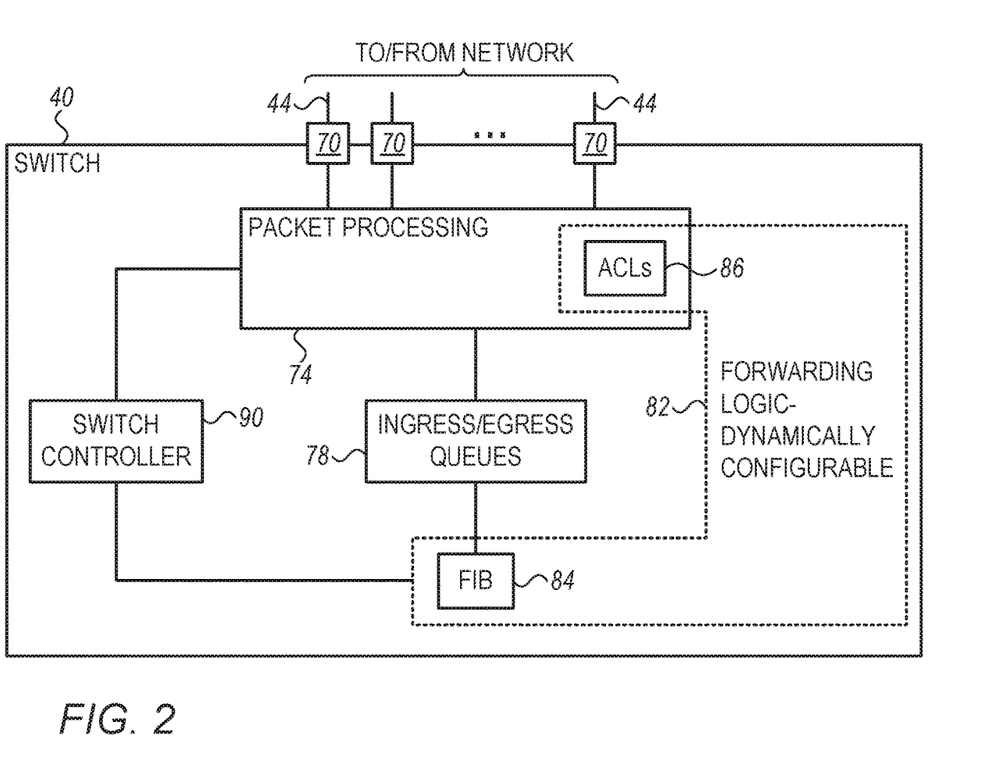
FIG. 2 is a block diagram that schematically illustrates a switch of the peering fabric of FIG. 1, in accordance with an embodiment that is described herein.

FIG. 2 is a block diagram that schematically illustrates a switch 40 of peering fabric 32 of FIG. 1, in accordance with an embodiment that is described herein.

Switch 40 comprises multiple ports 70 for connecting to other elements in communication network 20 using links 44, including switches of peering fabric 32, routers 28 of subnetworks 24, and server 50. Each of ports 70 functions both as an input port for receiving incoming packets, and as an output port for transmitting outgoing packets. Alternatively, a given port can function as either an input or output port.

Switch 40 comprises a packet processing module 74, for processing incoming and outgoing packets, and queues 78, for storing the received packets before being transmitted back to communication network 20. Queues 78 comprise one or more ingress queues for storing packets arriving via ports 70, and/or one or more egress queues for storing packets awaiting transmission to the communication network via ports 70. In an embodiment, queues 78 are implemented in a shared buffer (not shown), in which queues of different sizes may be dynamically allocated to different data flows or to different input or output ports. In alternative switch embodiments, a conventional buffer in which the queues have the same size can also be used.

In the ingress direction, packet processing module 74 applies to the received packets various processing such as verifying the correctness of the data in the packet payload, packet classification and prioritization, and routing. To this end, the packet processing module typically checks certain fields in the packets' headers such as source and destination addresses, source and destination port numbers, and the underlying network protocol used. In the egress direction, packet processing module 74 schedules the transmission of packets stored in the egress queues via respective output ports 70 using any suitable arbitration scheme.

In some embodiments, switch 40 temporarily stores packets for which there is no available egress queue or packets whose processing has not yet completed, in one or more ingress queues. Switch 40 stores packets whose routing has been resolved and awaiting transmission in egress queues.

In some embodiments, switch 40 comprises forwarding logic 82, which forwards packets between input and output ports 70, for implementing a desired routing scheme. In some embodiments, forwarding logic 82 is dynamically configurable, and may be updated, on the fly, by routing controller 64 of server 50.

Typically, each packet belongs to a certain data flow. By routing packets of a certain data flow to a certain port, switch fabric 32 causes the packets of that data flow to be delivered over a certain routing path through communication network 20. Depending on the current configuration of forwarding logic 82, switch 40 may route multiple different data flows to a common output port simultaneously.

In some embodiments, forwarding logic 82 comprises a Routing Information Base (FIB) 84 that stores associations between destination addresses (e.g., address prefixes) and output ports. In some embodiments, to reduce complexity and cost of switch 40, the switch FIB supports forwarding up to a number of address prefixes that is much lower than the full number of subnetworks in the communication network. For example, in the Internet, the overall number of ASs (e.g., ISPs, CDNs and the like) may be on the order of 780,000, whereas switch 40 may support up to about 100,000 destination prefix addresses.

In an embodiment, the FIB implements a routing scheme in accordance with the Classless Inter-Domain Routing (CIDR) protocol, which enables to exploit the IP address space efficiently, resulting in reduced size routing tables. The CIDR protocol is described, for example, in "Classless Inter-Domain Routing (CIDR): an Address Assignment and Aggregation Strategy," RFC-1519, September 1993.

In some embodiments, forwarding logic 82 is implemented within packet processing module 40, which queries headers of the packets received in the switch against one or more Access Control Lists (ACLs) 86 that each comprises one or more entries. An ACL entry typically comprises a rule and a respective action (e.g., forward or discard the packet) to be applied to a packet that matches the rule. In case of packet forwarding the ALC looks up the relevant prefix in FIB 84.

Switch 40 further comprises a switch controller 90, which performs various management and packet-processing functions of switch 40. For example, switch controller 90 configures FIB 84 and/or ACLs 86 to apply a desired routing scheme, e.g., in accordance with routing information received from server 50. By controlling the routing scheme, switch 40 may cause the packets to traverse various routing paths through communication network 20.

The configurations of communication network 20 and server 50 of FIG. 1, and of switch 40 of FIG. 2 are example configurations, which are chosen purely for the sake of conceptual clarity. In alternative embodiments, any other suitable communication network, server and switch configurations can also be used. Elements that are not necessary for understanding the principles of the present invention, such as various interfaces, addressing circuits, timing and sequencing circuits and debugging circuits, have been omitted from the figure for clarity.

Some elements of switch 40, such as packet processing module 74 and switch controller 90, may be implemented in hardware, e.g., in one or more Application-Specific Integrated Circuits (ASICs) or FPGAs. Additionally or alternatively, packet processing module 74 and switch controller 90 can be implemented using software, or using a combination of hardware and software elements. Memory 56 may comprise any suitable storage element such as, for example, a Random-Access Memory (RAM), a Nonvolatile (NVM) memory such as a Flash memory device. In some embodiments, memory 56 comprises multiple storage elements of various storage types.

In some embodiments, some of the functions of processor 54 and switch controller 90 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Methods for Efficient Routing in a Communication Network

Next are described methods for efficient routing in communication network 20 by server 50 adapting forwarding logic in switches 40 based traffic patterns monitored by the switches.

Figure 3:
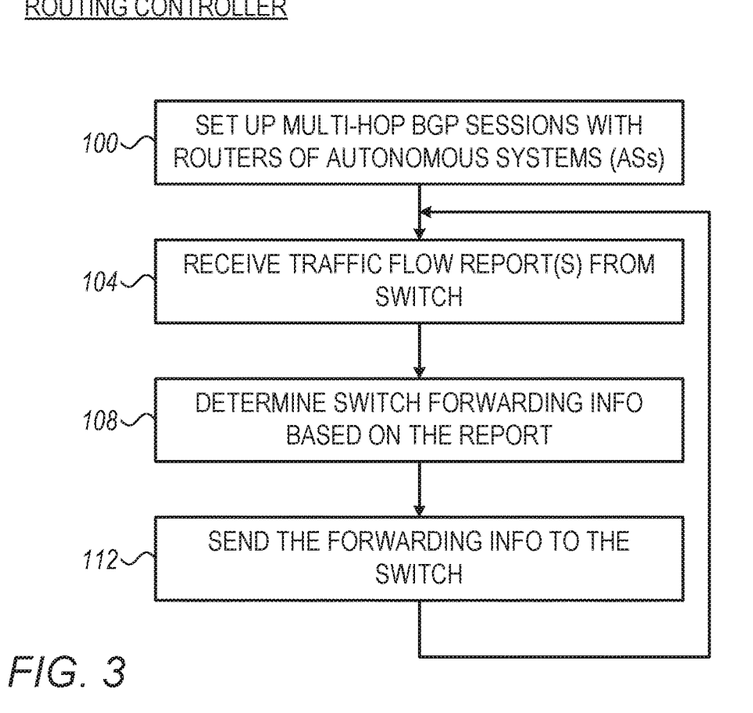
FIG. 3 is a flow chart that schematically illustrates a method for dynamically modifying forwarding logic in switches of the peering fabric of FIG. 1, in accordance with an embodiment that is described herein.

FIG. 3 is a flow chart that schematically illustrates a method for dynamically modifying forwarding logic in switches of the peering fabric of FIG. 1, in accordance with an embodiment that is described herein. In describing the method, routers 28 are assumed to serve as edge or routers or Autonomous System Boundary Routers (ASBRs) connecting among subnetworks 24. The method will be described as executed by routing controller 64.

The method begins with routing controller 64 setting up BGP sessions with routers 28 of autonomous systems 24, at a BGP setup step 100. Subnetworks communicating using the BGP are also referred to as "BGP neighbors" or BGP peers." Alternatively, any suitable peering protocol other than the BGP can also be used. The routing controller may set up multi-hop BGP sessions, in which the BGP peers communicate with one another via one or more intermediate routers.

At a reception step 104, routing controller 64 receives a traffic flow report from a switch 40 of the peering fabric. The traffic flow report comprises traffic information regarding destination subnetworks of data flows received in the switch, data flows for which the switch currently has no forwarding information within forwarding logic 82.

At a routing optimization step 108, the routing controller determines, based on the traffic flow report, switch forwarding information for up to a predefined number of destination subnetworks. The predefined number is typically related to the number of supported routing destinations by the switches. In an embodiment that forwards packets using ACLs 86, the forwarding information may comprise, for example, forwarding rules. In using FIB 84, the forwarding information may comprise, for example, address prefixes.

In some embodiments, routing controller 64 determines the forwarding information by selecting a partial subset of subnetworks reachable by forwarding database 68. In some example embodiments, routing controller 64 determines forwarding information for the most popular data flows received in the switch in a certain time window. Alternatively or additionally, the data flows may be assigned respective priorities that the routing controller extracts from one or more fields in the packet header, and the routing controller determines the forwarding information for selected data flows based on their priorities.

In an embodiment, routing controller 64 determines the forwarding information by performing one or more of (i) selecting from the forwarding database one or more address prefixes to be evicted from the forwarding logic and (ii) selecting from the forwarding database one or more address prefixes to be added to the forwarding logic.

In some embodiments, routing controller 64 determines the routing information for a given switch based on traffic flow reports received from multiple switches. In general, multiple switches may share the same forwarding information.

At a download step 112, routing controller 64 downloads the forwarding information to the switch.

Following step 112 the method loops back to step 104 to receive a subsequent traffic flow report from the same or another switch.

Figure 4:
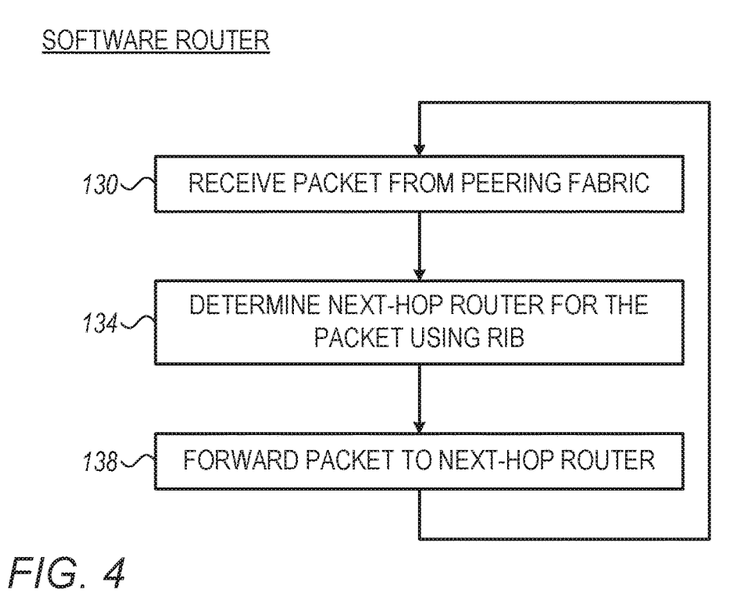
FIG. 4 is a flow chart that schematically illustrates a method for software routing, in accordance with an embodiment that is described herein.

FIG. 4 is a flow chart that schematically illustrates a method for software routing, in accordance with an embodiment that is described herein.

The method will be described as executed by software router 66 of FIG. 1.

The method begins with software router 66 receiving a packet from a switch 40 in peering fabric 32, via network adapter 62, at a packet reception step 130. The packet is typically sent by a switch 40 to the software router in response to a failure in forwarding the packet by that switch.

At a next-hop determination step 134, the software router determines for the received packet a next-hop router using forwarding database 68 (e.g., a RIB). The next-hop router may be one of routers 28 or another router not belonging to subnetworks 24A-24C.

In some embodiments, forwarding database 68 supports forwarding packets to all destination subnetworks in communication network 20, and therefore the software router can always find for a packet a suitable next-hop router.

At a forwarding step 138, software router 66 forwards the received packet to the next-hop router determined at step 134, via network adapter 62.

Following step 138 the method loops back to step 130 to receive a subsequent packet from peering fabric 32.

Figure 5:
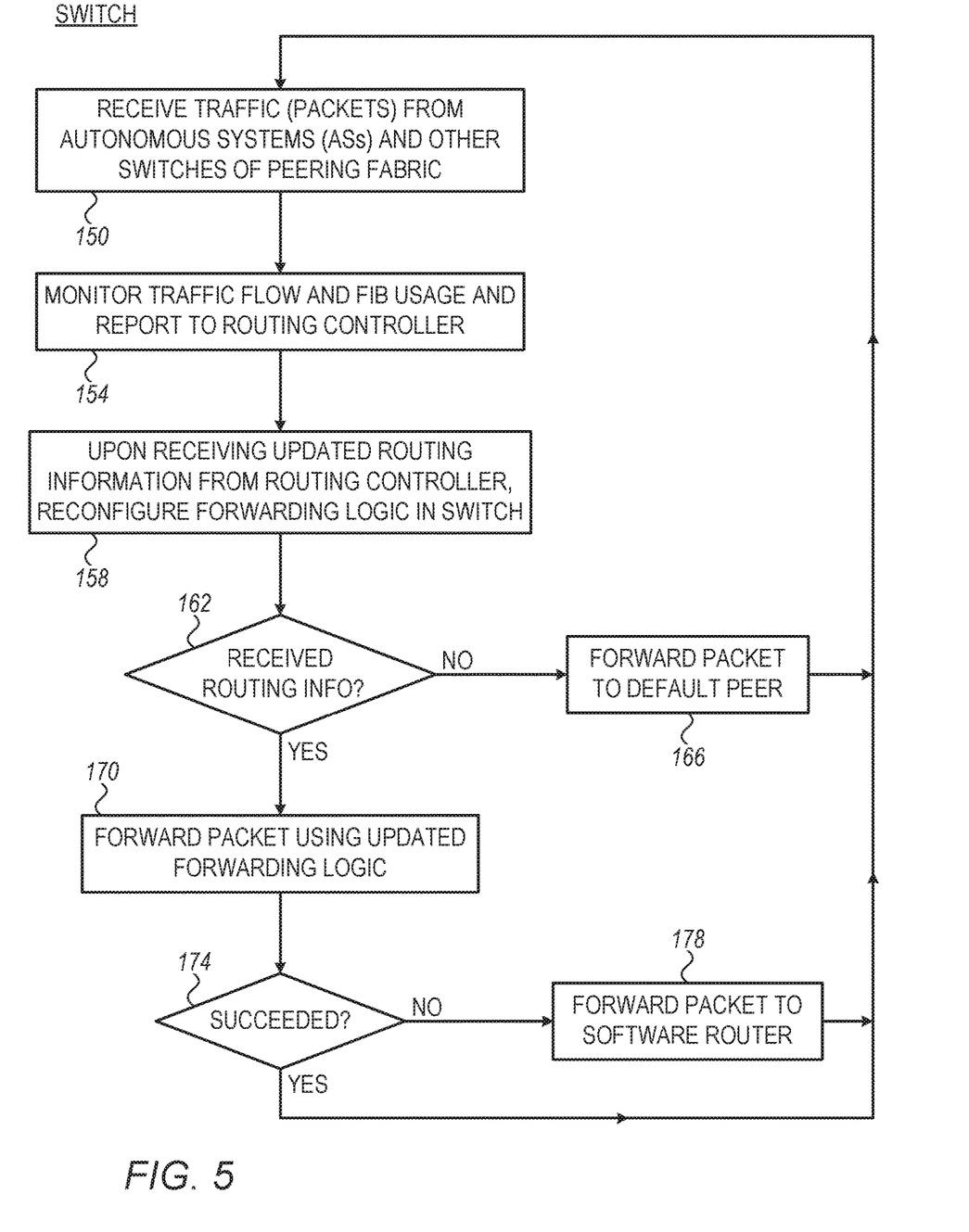
FIG. 5 is a flow chart that schematically illustrates a method for routing in a switch of the peering fabric of FIG. 1, using configurable forwarding logic, in accordance with an embodiment that is described herein.

FIG. 5 is a flow chart that schematically illustrates a method for routing in a switch of the peering fabric of FIG. 1, using configurable forwarding logic, in accordance with an embodiment that is described herein.

The method will be described as executed by switch 40. It is assumed, that initially (e.g., at reset, power up or initialization) the switch is configured to route incoming packets to a default peer subnetwork.

The method begins with switch 40 receiving packets from communication 20 (e.g., from autonomous systems 24 and from other switches of peering fabric 32) via ports 70, at a reception step 150. At a monitoring step 154, packet processing module 74 monitors the traffic flowing through the switch. The packet processing module (or the switch controller) may also monitor the usage of FIB 84 (and/or ACLs 86), e.g., for identifying data flows that were redirected to server 50 for routing using software router 66.

Based on the monitoring, the switch controller generates a traffic flow report, and sends the report to server 50 via network adapter 62. The switch may use for monitoring the traffic using any suitable protocol such as, for example, one or more of the protocols: NetFlow, BGP Monitoring Protocol (BMP), and Sampled Flow (sFlow). The traffic flow report is used by software router 64 to produce routing information for the switch, as described above.

At a forwarding logic updating step 158, upon receiving the routing information from routing controller 64, the switch reconfigures its forwarding logic 82 based on the received routing information. For example, the routing information comprises address prefixes, in which case the switch configures the FIB for routing using the received prefixes. In an embodiment, the routing information comprises one or prefixes to be evicted from the switch forwarding logic, and/or one or more prefixes to be added to the switch forwarding logic. In this embodiment, the switch updates the forwarding logic by evicting and/or adding a relatively small number of prefixes rather than reconfiguring the entire forwarding logic, therefore reducing overhead and latency. This efficient updating scheme is also referred to as an "incremental update" scheme.

At an update query step 162, the switch checks whether forwarding logic 82 has been updated at least once (e.g., after reset or initialization), and if not, forwards the packet to the default peer subnetwork, at a default forwarding step 166, and loops back to step 150 to receive subsequent packets. Otherwise, forwarding logic 82 has already been updated (one or more times after reset) by the routing controller, and the switch proceeds to a forwarding logic usage step 170, at which the switch forwards the packet using the recently updated forwarding logic.

At a forwarding checking step 174, the switch checks whether forwarding the packet at step 170 has succeeded or not. In forwarding the packet, the switch determines, using the forwarding logic, a next-hop route for a packet, based on address prefixes in FIB 84.

In an embodiment, the forwarding operation succeeds when the forwarding logic can forward the packet using the current forwarding logic and fails otherwise. When the outcome at step 174 is positive, the switch loops back to step 150. Otherwise, the switch failed to forward the packet and sends the packet for forwarding by software router 66, at a software routing step 178, and then loops back to step 150.

The embodiments described above are given by way of example, and other suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A routing apparatus, comprising:
multiple interconnected switches, wherein at least some of the switches connect directly or indirectly to routers belonging to multiple subnetworks, and wherein at least a given switch among the multiple switches is configured to:
receive a packet destined to a subnetwork reachable via the given switch, from a switch or a router, and forward the packet using forwarding logic of the given switch, wherein the forwarding logic supports only a partial subset of the multiple subnetworks; and
monitor traffic flow via the given switch and report traffic flow information indicative of at least a given subnetwork that is unreachable via the given switch; and
a server coupled to one or more of the switches, and comprising a processor configured to:
receive the traffic flow information from the given switch, and determine switch forwarding information for at least the given subnetwork, based at least on the traffic flow information; and
download the switch forwarding information to the given switch, for enabling the forwarding logic of the given switch to forward subsequent packets destined to the given subnetwork.

2. The routing apparatus according to claim 1, wherein the server comprises a forwarding database supporting access to one or more subnetworks that are unreachable using the forwarding logic of the given switch, and wherein the processor is configured to receive from the given switch a packet destined to a subnetwork that is unreachable using the forwarding logic currently used by the given switch, and to forward the packet using the forwarding database.

3. The routing apparatus according to claim 2, wherein the processor is configured to determine the switch forwarding information by selecting a partial subset of subnetworks reachable by the forwarding database.

4. The routing apparatus according to claim 2, wherein the processor is configured to determine the switch forwarding information by performing one or more of (i) selecting from the forwarding database one or more address prefixes to be evicted from the forwarding logic and (ii) selecting from the forwarding database one or more address prefixes to be added to the forwarding logic.

5. The routing apparatus according to claim 2, wherein the multiple subnetworks comprise autonomous systems of the Internet, wherein the forwarding logic comprises a Forwarding Information Table (FIB), wherein the forwarding database comprises a Routing Information Base (RIB), and wherein the FIB and RIB support routing based on address prefixes associated with respective autonomous systems.

6. The routing apparatus according to claim 1, wherein the traffic flow information is indicative of a prevalence of subnetworks destined to by the given switch, and wherein the processor is configured to determine the switch forwarding information by selecting for the given switch, based on the prevalence, up to a predefined number of the multiple subnetworks.

7. The routing apparatus according to claim 1, wherein before receiving a first switch forwarding information, the given switch is configured to forward received packets to a selected default subnetwork.

8. The routing apparatus according to claim 1, wherein the given switch is configured to monitor the traffic flow using one or more protocols selected from a protocol list comprising a NetFlow protocol, a BGP Monitoring Protocol (BMP), and a Sampled Flow (sFlow) protocol.

9. The routing apparatus according to claim 1, wherein the given switch is configured to determine, using the forwarding logic a next-hop route for a packet, based on address prefixes in a FIB.

10. A method for routing, comprising:
in a routing apparatus comprising multiple interconnected switches, and a server coupled to one or more of the switches, wherein at least some of the switches connect directly or indirectly to routers belonging to multiple subnetworks,
receiving a packet destined to a subnetwork reachable via the given switch, from a switch or a router, and forwarding the packet using forwarding logic of the given switch, wherein the forwarding logic supports only a partial subset of the multiple subnetworks;
monitoring traffic flow via the given switch and reporting traffic flow information indicative of at least a given subnetwork that is unreachable via the given switch;
receiving, by the server, the traffic flow information from the given switch for at least the given subnetwork, and determining switch forwarding information for at least the given subnetwork, based at least on the traffic flow information; and
downloading the switch forwarding information to the given switch for enabling the forwarding logic of the given switch to forward subsequent packets destined to the given subnetwork.

11. The method according to claim 10, wherein the server comprises a forwarding database supporting access to one or more subnetworks that are unreachable using the forwarding logic of the given switch, and comprising receiving from the given switch a packet destined to a subnetwork that is unreachable using the forwarding logic currently used by the given switch, and forwarding the packet using the forwarding database.

12. The method according to claim 11, wherein determining the switch forwarding information comprises selecting a partial subset of subnetworks reachable by the forwarding database.

13. The method to claim 11, wherein determining the switch forwarding information comprises performing one or more of (i) selecting from the forwarding database one or more address prefixes to be evicted from the forwarding logic and (ii) selecting from the forwarding database one or more address prefixes to be added to the forwarding logic.

14. The method to claim 11, wherein the multiple subnetworks comprise autonomous systems of the Internet, wherein the forwarding logic comprises a Forwarding Information Table (FIB), wherein the forwarding database comprises a Routing Information Base (RIB), and wherein the FIB and RIB support routing based on address prefixes associated with respective autonomous systems.

15. The method according to claim 10, wherein the traffic flow information is indicative of a prevalence of subnetworks destined to by the given switch, and wherein determining the switch forwarding information comprises selecting for the given switch, based on the prevalence, up to a predefined number of the multiple subnetworks.

16. The method according to claim 10, and comprising, before receiving a first switch forwarding information, forwarding received packets by the given switch to a selected default subnetwork.

17. The method according to claim 10, monitoring the traffic flow comprises monitoring the traffic flow using one or more protocols selected from a protocol list comprising a NetFlow protocol, a BGP Monitoring Protocol (BMP), and a Sampled Flow (sFlow) protocol.

18. The method according to claim 10, wherein forwarding the packet comprises determining, using the forwarding logic a next-hop route for a packet, based on address prefixes in a FIB.

* * * * *